(12) United States Patent
Takanishi et al.

(10) Patent No.: US 9,903,498 B2
(45) Date of Patent: Feb. 27, 2018

(54) SOLENOID VALVE AND MANUFACTURING METHOD OF THE SAME

(71) Applicant: JTEKT CORPORATION, Osaka-shi, Osaka (JP)

(72) Inventors: Koichi Takanishi, Nishio (JP); Toshio Murakami, Nagoya (JP); Kaori Fujita, Kariya (JP); Itsuki Ono, Tokai (JP)

(73) Assignee: JTEKT CORPORATION, Osaka-shi (JP)

( * ) Notice: Subject to any disclaimer, the term of this patent is extended or adjusted under 35 U.S.C. 154(b) by 7 days.

(21) Appl. No.: 14/629,935

(22) Filed: Feb. 24, 2015

(65) Prior Publication Data

US 2015/0247585 A1    Sep. 3, 2015

(30) Foreign Application Priority Data

Mar. 3, 2014    (JP) .................. 2014-040250

(51) Int. Cl.
| | |
|---|---|
| *F16K 31/06* | (2006.01) |
| *F16K 27/04* | (2006.01) |
| *B23P 15/00* | (2006.01) |
| *B23P 11/00* | (2006.01) |

(52) U.S. Cl.
CPC ........ *F16K 31/0613* (2013.01); *F16K 27/041* (2013.01); *F16K 27/048* (2013.01); *F16K 31/0686* (2013.01); *B23P 11/005* (2013.01); *B23P 15/001* (2013.01); *Y10T 29/49412* (2015.01)

(58) Field of Classification Search
CPC ............. F16K 31/0613; F16K 31/0686; F16K 27/041; F16K 27/048; B23P 11/005; B23P 15/001; Y10T 29/49412

USPC ..... 137/625.64, 625.65, 625.69; 251/129.15; 29/515–520

See application file for complete search history.

(56) References Cited

U.S. PATENT DOCUMENTS

| | | | | | |
|---|---|---|---|---|---|
| 5,000,222 | A | * | 3/1991 | Moenkhaus | ............ F16L 55/02 137/15.18 |
| 5,014,747 | A | * | 5/1991 | Suzuki | ............... G05D 16/2013 137/625.65 |
| 5,284,398 | A | * | 2/1994 | Sakai | .................... B23P 11/005 29/898.043 |
| 5,499,439 | A | * | 3/1996 | Zaborszki | ............... F16L 13/02 228/136 |
| 5,848,613 | A | * | 12/1998 | Sakaguchi | .......... F15B 13/0402 137/625.65 |
| 5,868,167 | A | * | 2/1999 | Miki | ................... F16H 61/0251 137/625.65 |

(Continued)

FOREIGN PATENT DOCUMENTS

JP    2012-220013 A    11/2012

*Primary Examiner* — Ian Paquette
(74) *Attorney, Agent, or Firm* — Oliff PLC (57) ABSTRACT

A solenoid valve has a coil spring that biases a spool valve toward a solenoid portion, and an adjuster screw that is positioned to interpose the coil spring between the adjuster screw and the spool valve and that is screwed in an internally threaded portion of a sleeve so that its axial position is adjusted. The sleeve is swaged with a swaging tool etc. from an outer peripheral surface located on the outer peripheral side of the internally threaded portion of the sleeve, whereby the swaged part of the internally threaded portion is plastically deformed to the opposite side from the coil spring. The adjuster screw is thus fixed.

5 Claims, 4 Drawing Sheets

(56) References Cited

U.S. PATENT DOCUMENTS

| 8,707,994 B2* | 4/2014 | Mizui | F15B 13/0402 |
| | | | 137/625.25 |
| 2014/0054485 A1* | 2/2014 | Tomita | F16K 31/0613 |
| | | | 251/318 |

* cited by examiner

SOLENOID VALVE AND MANUFACTURING METHOD OF THE SAME

INCORPORATION BY REFERENCE

The disclosure of Japanese Patent Application No. 2014-040250 filed on Mar. 3, 2014 including the specification, drawings and abstract, is incorporated herein by reference in its entirety.

BACKGROUND OF THE INVENTION

1. Field of the Invention

The invention relates to solenoid valves that control the pressure of hydraulic fluid, and manufacturing methods of the same.

2. Description of the Related Art

Conventionally, solenoid valves are known in the art which include a solenoid portion that generates an electromagnetic force, a cylindrical sleeve having a valve hole, and a shaft-shaped spool valve that moves in the axial direction in the valve hole, and which controls the pressure of hydraulic fluid by the axial movement of the spool valve. See, e.g., Japanese Patent Application Publication No. 2012-220013 (JP 2012-220013 A).

The solenoid valve described in JP 2012-220013 A includes a linear solenoid that generates an electro-magnetic force, a sleeve having internal threads formed on the inner periphery of its one axial end, a spool valve that is pressed by actuation of the linear solenoid to move in the valve hole of the sleeve, a spring that biases the spool valve toward the linear solenoid, and an adjuster screw having external threads formed in the outer periphery thereof.

The adjuster screw has a function to adjust the biasing force of the spring. When attaching the adjuster screw, the external threads of the adjuster screw are made to mate with the internal threads of the sleeve to adjust the axial position of the adjuster screw, whereby the biasing force of the spring is adjusted.

First, the axial position of the adjuster screw is adjusted temporarily. Then, the sleeve is swaged from its outer periphery to fix the adjuster screw temporarily. This temporary fixing reduces the gap between the external threads of the adjuster screw and the internal threads of the sleeve, and suppresses wobbling of the adjuster screw in the axial direction. After this temporary fixing, the axial position of the adjuster screw is adjusted again as final adjustment, and further swaging is performed to fix the adjuster screw as final fixing. This suppresses fluctuation in spring load after adjustment, whereby the biasing force of the spring can be accurately adjusted.

The method for fixing the adjuster screw as described in JP 2012-220013 A suppresses axial movement of the adjuster screw when performing swaging after the final adjustment, but requires to fix the adjuster screw by two steps, namely the temporary fixing and the final fixing. This increases man-hours for attaching the adjuster screw, which hinders improvement in productivity.

SUMMARY OF THE INVENTION

It is an object of the invention to provide a solenoid valve capable of accurately adjusting a biasing force that is applied to a spool valve and thus capable of accurately controlling the pressure of hydraulic fluid while suppressing an increase in man-hours, and a manufacturing method of such a solenoid valve.

According to one aspect of the invention, a solenoid valve includes: a solenoid portion having a plunger that moves in an axial direction according to a current supplied to an electro-magnetic coil; a cylindrical sleeve placed coaxially with the plunger and having an internally threaded portion formed on an inner peripheral surface of its end located on an opposite side from the solenoid portion; a spool valve that is accommodated in a valve hole formed in the sleeve and that slides on an inner surface of the sleeve according to the axial movement of the plunger; an elastic member that biases the spool valve toward the solenoid portion; and an adjusting screw that is positioned to interpose the elastic member between the adjusting screw and the spool valve, and that is screwed in the internally threaded portion of the sleeve so that its axial position is adjusted. Rotation of the adjusting screw relative to the sleeve is restricted by swaging the sleeve from an outer periphery of the internally threaded portion with a swaging tool, and a part of the internally threaded portion which is swaged with the swaging tool is plastically deformed to an opposite side from the elastic member.

Another aspect of the invention is directed to a manufacturing method of a solenoid valve. The solenoid valve includes a solenoid portion having a plunger that moves in an axial direction according to a current supplied to an electro-magnetic coil, a cylindrical sleeve placed coaxially with the plunger and having an internally threaded portion formed on an inner peripheral surface of its end located on an opposite side from the solenoid portion, a spool valve that is accommodated in a valve hole formed in the sleeve and that slides on an inner surface of the sleeve according to the axial movement of the plunger, an elastic member that biases the spool valve toward the solenoid portion, and an adjusting screw that is positioned to interpose the elastic member between the adjusting screw and the spool valve, and that is screwed in the internally threaded portion of the sleeve. A biasing force of the elastic member which biases the spool valve is adjusted by the adjusting screw. The manufacturing method according to this aspect includes: adjusting the biasing force of the elastic member by adjusting an axial position of the adjusting screw with respect to the sleeve by rotating the adjusting screw; and fixing the adjusting screw at a position adjusted by the adjusting step by pressing a swaging tool against the sleeve to swage the sleeve from an outer periphery of the internally threaded portion. The fixing step plastically deforms the internally threaded portion to an opposite side from the elastic member in the axial direction by the swaging.

According to the aspects of the invention, the biasing force that is applied to the spool valve can be accurately adjusted and thus the pressure of hydraulic oil can be accurately controlled while suppressing an increase in man-hours.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
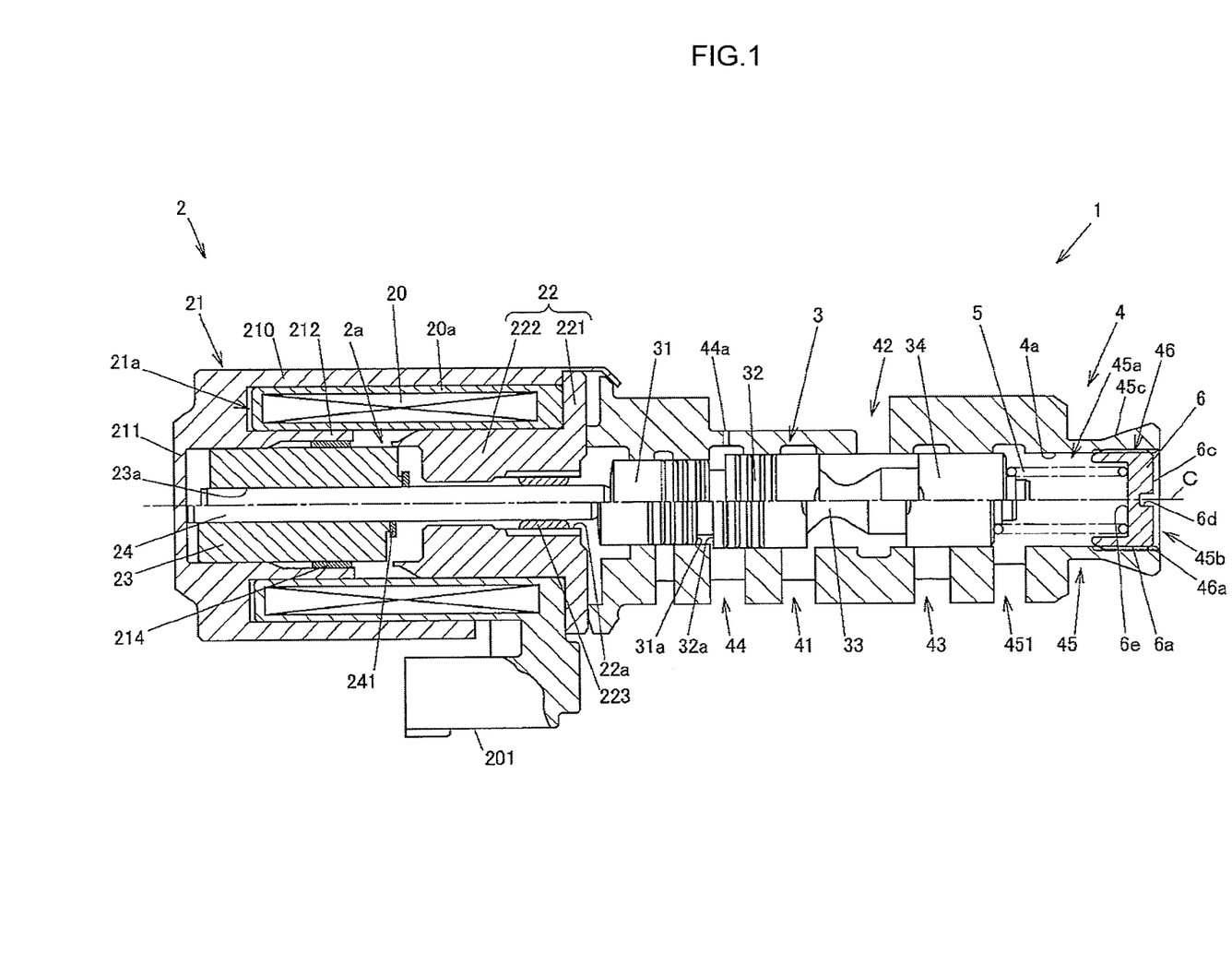
FIG. 1 is a sectional view of a configuration example of a solenoid valve according to an embodiment of the invention.

FIG. 1 is a sectional view showing a configuration example of a solenoid valve according to an embodiment of the invention. In FIG. 1, the portion above a central axis C shows the state where a current is applied to the solenoid valve, and the portion below the central axis C shows the state where no current is applied to the solenoid valve.

A solenoid valve 1 includes a solenoid portion 2, a cylindrical sleeve 4, and a spool valve 3. The solenoid portion 2 has a plunger 23 that moves in the axial direction according to a current supplied to an electro-magnetic coil 20. The sleeve 4 is placed coaxially with the plunger 23, and has an internally threaded portion 46 formed on an inner peripheral surface of its end located on the opposite side from the solenoid portion 2. The spool valve 3 is accommodated in a valve hole 4a formed in the sleeve 4, and slides on the inner surface of the sleeve 4 according to the axial movement of the plunger 23.

The solenoid valve 1 further includes a coil spring 5 and an adjuster screw 6. The coil spring 5 is an elastic member that biases the spool valve 3 toward the solenoid portion 2. The adjuster screw 6 is an adjusting screw positioned to interpose the coil spring 5 between the adjuster screw 6 and the spool valve 3, and screwed in the internally threaded portion 46 of the sleeve 4 so that its axial position is adjusted.

The solenoid portion 2 includes the electro-magnetic coil 20, a cylindrical cover member 21 made of a magnetic material, a core member 22 made of a magnetic material, and the plunger 23 that moves in the axial direction with respect to the cover member 21 and the core member 22.

The electro-magnetic coil 20 is accommodated in an annular coil accommodating space 21a formed in the cover member 21, and is covered by a bobbin 20a. The electro-magnetic coil 20 is supplied with an exciting current from a connector portion 201 fixed to the outer periphery of the cover member 21 and generates a magnetic field.

The cover member 21 is formed by a cylindrical body portion 210, a bottom portion 211, and a cylindrical protruding portion 212 protruding along the central axis C from the bottom portion 211. A bearing bush 214 that guides the axial movement of the plunger 23 is placed inside the protruding portion 212.

A core member 22 has a flange portion 221 and a cylindrical flange protruding portion 222 integral with the flange portion 221. The flange portion 221 faces the electro-magnetic coil 20 in the axial direction, and the flange protruding portion 222 protrudes from the flange portion 221 toward the bottom portion 211 and the protruding portion 212 of the cover member 21. The core member 22 has an axial through hole 22a, and a bearing bush 223 is placed in the through hole 22a. A clearance 2a is provided between a tip end of the flange protruding portion 222 of the core member 22 and a tip end of the protruding portion 212 of the cover member 21.

The plunger 23 is accommodated in the cover member 21 via the bearing bush 214 so as to be movable in the axial direction. The plunger 23 has a through hole 23a in its center, and a base end of a shaft-shaped rod 24 is fixed in the through hole 23a. A stopper body 241 that restricts movement of the plunger 23 toward the core member 22 is fixed to the outer periphery of the rod 24 in order to restrict relative movement between the rod 24 and the plunger 23.

The rod 24 is guided by the bearing bush 223 and inserted through the through hole 22a formed in the core member 22, and a tip end of the rod 24 protrudes beyond the flange portion 221 of the core member 22. The tip end of the rod 24 which protrudes from the core member 22 contacts one end of the spool valve 3 described below to press the spool valve 3 toward one side in the axial direction along the central axis C.

The spool valve 3 mainly contains aluminum and is made of, e.g., an aluminum alloy containing a metal such as copper, manganese, silicon, magnesium, or zinc and thus having increased strength. The spool valve 3 is in the shape of a shaft, and has a first land portion 31, a second land portion 32, a smaller diameter portion 33, and a third land portion 34 in this order from the solenoid portion 2 side. The second land portion 32 has a larger diameter than the first land portion 31, and the smaller diameter portion 33 has a smaller diameter than the second land portion 32.

The spool valve 3 is elastically biased toward the solenoid portion 2 by the coil spring 5 that contacts an axial end face of the third land portion 34 which is located on the opposite side from the solenoid portion 2. The tip end of the rod 24 contacts an axial end face of the first land portion 31 which is located on the solenoid portion 2 side. When the solenoid portion 2 is not actuated, the base end of the rod 24 contacts the bottom portion 211 of the cover member 21, as shown in the lower part of FIG. 1.

The sleeve 4 has a supply port 41, an output port 42, a discharge port 43, a feedback port 44, and a cylinder portion 45. Hydraulic fluid is supplied from an oil pump, not shown, to the supply port 41. When no current is applied to the solenoid portion 2, the output port 42 communicates with the supply port 41 to output the hydraulic fluid to a member to be controlled such as a clutch of an electronic controlled automatic transmission device. When a current is applied to the solenoid portion 2, the discharge port 43 communicates with the output port 42 to discharge the hydraulic fluid. Part of the hydraulic fluid flowing out from the output port 42 flows into the feedback port 44 through a feedback port hole 44a. The cylinder portion 45 contains a spring chamber 45a accommodating the coil spring 5. The internally threaded portion 46 is formed on the inner periphery of the cylinder portion 45.

The hydraulic fluid guided through the feedback port hole 44a to the feedback port 44 biases the spool valve 3 toward the coil spring 5 according to the difference in area between an axial end face 31a on the feedback port 44 side of the first land portion 31 and an axial end face 32a on the feedback port 44 side of the second land portion 32. The spool valve 3 is thus subjected to the magnetic force of the electro-magnetic coil 20, the biasing force of the coil spring 5, and the feedback pressure, and is located at a position where these forces are balanced.

The cylinder portion 45 is provided at an end of the sleeve 4 which is located on the opposite side from the solenoid portion 2, and an opening 45b of the cylinder portion 45 is closed by the adjuster screw 6. The cylinder portion 45 has a communication hole 451 that allows the space in the spring chamber 45a to communicate with the outside. An outer peripheral surface 45c of the cylinder portion 45 of the sleeve 4 is a tilted surface tilted so that the distance to the central axis C increases toward the opening 45b located on the internally threaded portion 46 side of the sleeve 4. The internally threaded portion 46 is formed by helically cutting on the inner peripheral surface of the cylinder portion 45 internal threads 46a that mate with the adjuster screw 6.

The adjuster screw 6 is a member that is in the shape of a bottomed cylinder and is made of a material such as aluminum etc. External threads 6a capable of mating with the internally threaded portion 46 of the sleeve 4 are formed on the outer periphery of the adjuster screw 6. One end of the compressed coil spring 5 contacts an axial end 6e on the spool valve 3 side of the adjuster screw 6. That is, the adjuster screw 6 is constantly subjected to the biasing force from the coil spring 5 in the opposite direction from the solenoid portion 2. An attachment groove 6d is formed on an axial end face 6c of the adjuster screw 6 which is located on the opposite side from the spool valve 3. The attachment groove 6d is used to rotate the adjuster screw 6 with a driver tool etc. when attaching the adjuster screw 6.

The adjuster screw 6 is fixed to the sleeve 4 by swaging the sleeve 4 with a swaging tool etc. from the outer periphery of the internally threaded portion 46 of the sleeve 4. More specifically, when swaging the sleeve 4 with the swaging tool, the gap between the external threads 6a of the adjuster screw 6 and the internal threads 46a of the internally threaded portion 46 is reduced to restrict rotation of the adjuster screw 6 relative to the sleeve 4. A method for attaching the adjuster screw 6 will be described in detail later.

Operation of the solenoid valve 1 will be described. When a current is supplied to the electro-magnetic coil 20, the spool valve 3 moves in the axial direction to the opposite side from the solenoid portion 2 as shown in the upper half of FIG. 1. Accordingly, communication between the supply port 41 and the output port 42 is blocked by the second land portion 32 of the spool valve 3, and the output port 42 and the discharge port 43 communicate with each other through the outer peripheral side of the smaller diameter portion 33 of the spool valve 3.

When the current supply to the electro-magnetic coil 20 is stopped, the supply port 41 and the output port 42 communicate with each other through the outer peripheral side of the smaller diameter portion 33, and the communication between the output port 42 and the discharge port 43 is blocked by the third land portion 34 of the spool valve 3, as shown in the lower half of FIG. 1. The solenoid valve 1 switches the communication state among the supply port 41, the output port 42, and the discharge port 43 by the axial movement of the spool valve 3.

The area of the flow passage between the supply port 41 and the output port 42 changes according to the current that is supplied to the electro-magnetic coil 20. The pressure of the hydraulic fluid that is output from the output port 42 therefore changes in proportion to the current that is supplied to the electro-magnetic coil 20. In the present embodiment, the pressure of the hydraulic fluid decreases proportionally as the current that is supplied to the electro-magnetic coil 20 increases.

The solenoid valve 1 controls the pressure of the hydraulic fluid that flows through the solenoid valve 1 by changing the area of the flow passage of the hydraulic fluid between the supply port 41 and the output port 42 and the area of the flow passage between the output port 42 and the discharge port 43.

An example of adjustment and fixing steps as an attachment step of attaching the adjuster screw 6 of the solenoid valve 1 will be described with reference to FIGS. 2A to 3B.

Figure 2A:
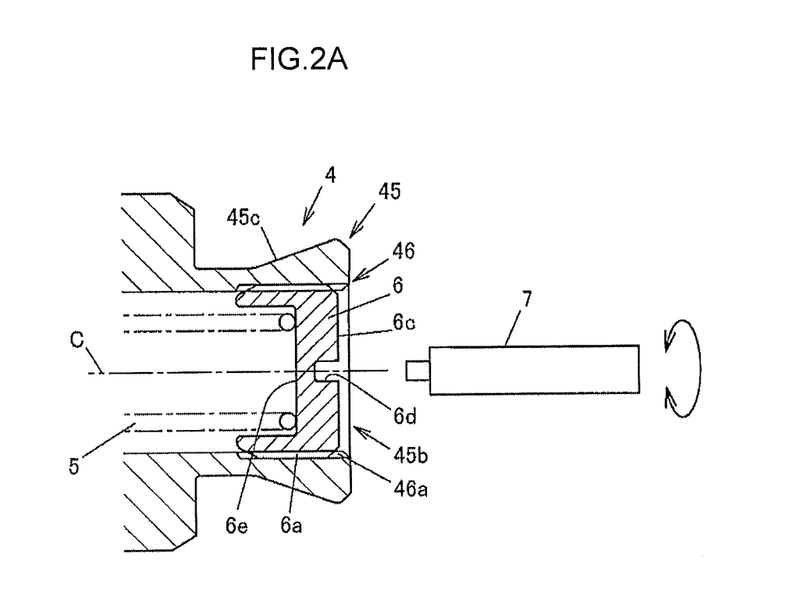
FIG. 2A is a magnified figure of an internally threaded portion and its peripheral portion according to the embodiment of the invention, illustrating an adjustment step.
Figure 2B:
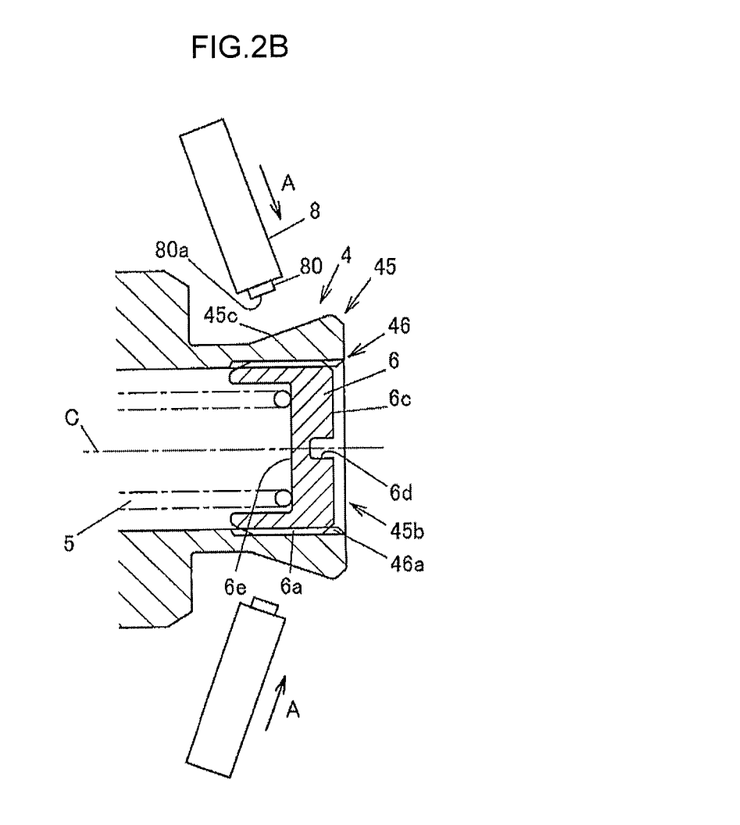
FIG. 2B is a magnified figure of the internally threaded portion and its peripheral portion according to the embodiment of the invention, illustrating a fixing step.
Figure 3A:
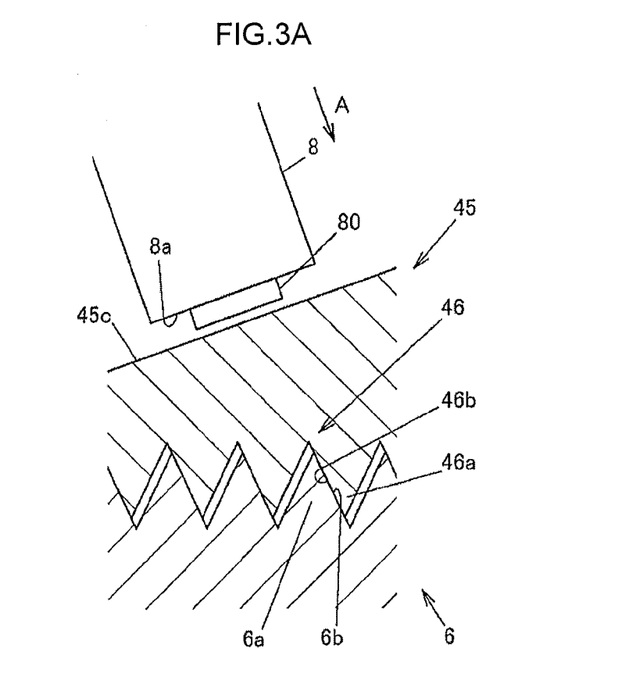
FIG. 3A is a magnified sectional view of the internally threaded portion in the fixing step, showing the state before swaging.
Figure 3B:
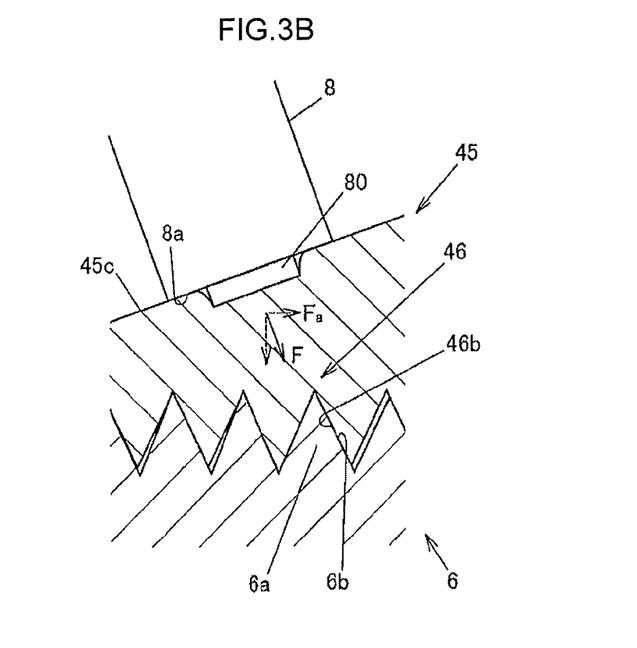
FIG. 3B is a magnified sectional view of the internally threaded portion in the fixing step, showing the state after swaging.

FIG. 2A shows the adjustment step of adjusting the position of the adjuster screw 6, and FIG. 2B shows the fixing step of fixing the adjuster screw 6. FIGS. 3A and 3B are magnified figures of the internally threaded portion 46 before and after the fixing step. FIG. 3A shows the state before swaging, and FIG. 3B shows the state after swaging.

In the adjustment step shown in FIG. 2A, the amount by which the external threads 6a of the adjuster screw 6 are screwed in the internally threaded portion 46 of the sleeve 4 is adjusted with a driver tool 7 to adjust the axial position of the adjuster screw 6 with respect to the sleeve 4, whereby the biasing force of the coil spring 5 is adjusted.

The driver tool 7 is fitted into the attachment groove 6d of the adjuster screw 6, and the external threads 6a of the adjuster screw 6 are made to mate with the internal threads 46a of the internally threaded portion 46. A predetermined current is then applied to the electro-magnetic coil 20 to actuate the solenoid valve 1. In this state, the adjuster screw 6 is rotated with the driver tool 7 to move in the axial direction. The compression ratio of the coil spring 5 changes according to the axial movement of the adjuster screw 6, and the biasing force of the coil spring 5 varies according to the change in compression ratio. The spool valve 3 is shifted in the axial direction according to the variation in biasing force, and thus the control pressure for the hydraulic fluid also varies accordingly. While monitoring the variation in control pressure, the axial position of the adjuster screw 6 is adjusted to the position where the control pressure for the hydraulic fluid is equal to the control pressure according to the predetermined current.

In the adjustment step, the biasing force of the coil spring 5 that biases the spool valve 3 is adjusted by adjusting the axial position of the adjuster screw 6 with respect to the sleeve 4.

In this adjustment step, there is a gap in the radial and axial directions between the external threads 6a of the adjuster screw 6 and the internal threads 46a of the internally threaded portion 46 of the sleeve 4. The adjuster screw 6 can therefore rotate relative to the sleeve 4, and is pressed toward the opening 45b in the axial direction by the biasing force of the coil spring 5.

The fixing step of fixing the adjuster screw 6 to the sleeve 4 will be described. In this fixing step, as shown in FIG. 2B, a plurality of swaging tools 8, two swaging tools 8 in the present embodiment, are positioned to interpose the cylinder portion 45 of the sleeve 4 therebetween from the outer periphery of the cylinder portion 45. Each of the swaging tools 8 is then moved toward the outer peripheral surface 45c of the cylinder portion 45 in the direction (direction shown by arrow A) tilted by a predetermined angle with respect to the direction perpendicular to the central axis C so that a pressing surface 80a of a pressing portion 80 faces toward the opening 45b. At this time, the swaging direction in which the swaging tools 8 are pressed against the outer peripheral surface 45c of the cylinder portion 45 includes a component of the direction of a reaction force that is applied from the coil spring 5 to the adjuster screw 6. A part of the internally threaded portion 46 which is swaged by the swaging tool 8 is therefore plastically deformed to the opposite side from the coil spring 5 in the axial direction. This plastic deformation of the internally threaded portion 46 will be described in detail later.

In the state before swaging shown in FIG. 3A, the adjuster screw 6 is subjected to the biasing force from the coil spring 5 in the opposite direction from the solenoid portion 2. Accordingly, flank surfaces 6b of the external threads 6a of the adjuster screw 6 which are located on the opposite side from the coil spring 5 are in contact with flank surfaces 46b of the internal threads 46a of the internally threaded portion 46 which are located on the coil spring 5 side. As shown in FIG. 3B, as the pressing portion 80 of the swaging tool 8 is pressed against the outer peripheral surface 45c of the cylinder portion 45, the flank surfaces 46b of the internal threads 46a of the internally threaded portion 46 move along the flank surfaces 6b of the external threads 6a of the adjuster screw 6 to reduce the gap between the external threads 6a of the adjuster screw 6 and the internal threads 46a of the internally threaded portion 46. A part of the outer peripheral surface 45c of the cylinder portion 45 which is pressed by the swaging tool 8 is depressed according to the shape of the pressing portion 80 of the swaging tool 8. At this time, the pressing portion 80 moves in the direction shown by arrow A until a receiving surface 8a of the swaging tool 8 contacts the outer peripheral surface 45c of the cylinder portion 45.

It is desirable that the pressing direction (direction shown by arrow A) of the swaging tool 8 be parallel to the flank surfaces 46b of the internally threaded portion 46 which are located on the coil spring 5 side. However, the pressing direction of the swaging tool 8 is not limited to this. The internally threaded portion 46 need only be plastically deformed at least to the opposite side from the coil spring 5 by the swaging with the swaging tool 8, and the pressing direction of the swaging tool 8 need not necessarily be parallel to the flank surfaces 46b of the internally threaded portion 46 which are located on the coil spring 5 side.

When the swaging tool 8 is moved, the internally threaded portion 46 is subjected to a force F having a component Fa of the direction parallel to the central axis C (see FIGS. 2A and 2B) of the sleeve 4. The flank surfaces 46b of the internal threads 46a of the internally threaded portion 46 thus move along the flank surfaces 6b of the external threads 6a of the adjuster screw 6, and the internally threaded portion 46 is plastically deformed to the opposite side from the coil spring 5, thereby reducing the gap between the external threads 6a of the adjuster screw 6 and the internal threads 46a of the internally threaded portion 46.

The present embodiment described above has the following functions and advantageous effects.

(1) When fixing the adjuster screw 6 to the sleeve 4, a part of the internally threaded portion 46 of the sleeve 4 which is swaged with the swaging tool 8 is plastically deformed to the opposite side from the coil spring 5. Accordingly, the adjuster screw 6 can be fixed to the sleeve 4 while suppressing axial movement of the adjuster screw 6 as compared to the case where, e.g., the internal threads 46a are moved toward the adjuster screw 6 perpendicularly to the central axis C when swaging the sleeve 4. That is, the adjuster screw 6 can be fixed to the sleeve 4 while suppressing movement of the adjuster screw 6 from the adjusted position in the adjustment step. According to the solenoid valve 1 having this configuration, the adjuster screw 6 can be fixed to the sleeve 4 by single swaging. Accordingly, the pressure of the hydraulic fluid that is output from the output port 42 can be accurately controlled while suppressing an increase in man-hours.

(2) Since the pressing direction of the swaging tool 8 for swaging the internally threaded portion 46 has a component of the direction of the reaction force that is applied from the coil spring 5 to the adjuster screw 6, the internally threaded portion 46 can be reliably plastically deformed to the opposite side from the coil spring 5 in the axial direction.

(3) The outer peripheral surface 45c of the cylinder portion 45 of the sleeve 4 is such a tilted surface that the distance from the central axis C increases toward the opening 45b located on the internally threaded portion 46 side of the sleeve 4. This can prevent the pressing portion 80 of the swaging tool 8 from slipping on the outer peripheral surface 45c when swaging the internally threaded portion 46 with the swaging tool 8, as compared to the case where the outer peripheral surface 45c is a flat surface parallel to the central axis C. That is, the internally threaded portion 46 can be more reliably swaged.

(4) In a manufacturing method of the solenoid valve 1, a part of the internally threaded portion 46 which is to be swaged with the swaging tool 8 in the fixing step of fixing the adjuster screw 6 to the sleeve 4 is plastically deformed to the opposite side from the coil spring 5. Accordingly, as in (1) described above, the adjuster screw 6 can be fixed to the sleeve 4 while suppressing fluctuation in the axial position of the adjuster screw 6. That is, the adjuster screw 6 can be fixed by single swaging while suppressing axial movement of the adjuster screw 6 during swaging. The solenoid valve 1 capable of accurately adjusting the biasing force that is applied to the spool valve 3 can thus be manufactured while suppressing an increase in man-hours.

A modification of the present embodiment will be described below with reference to FIG. 4.

Figure 4:
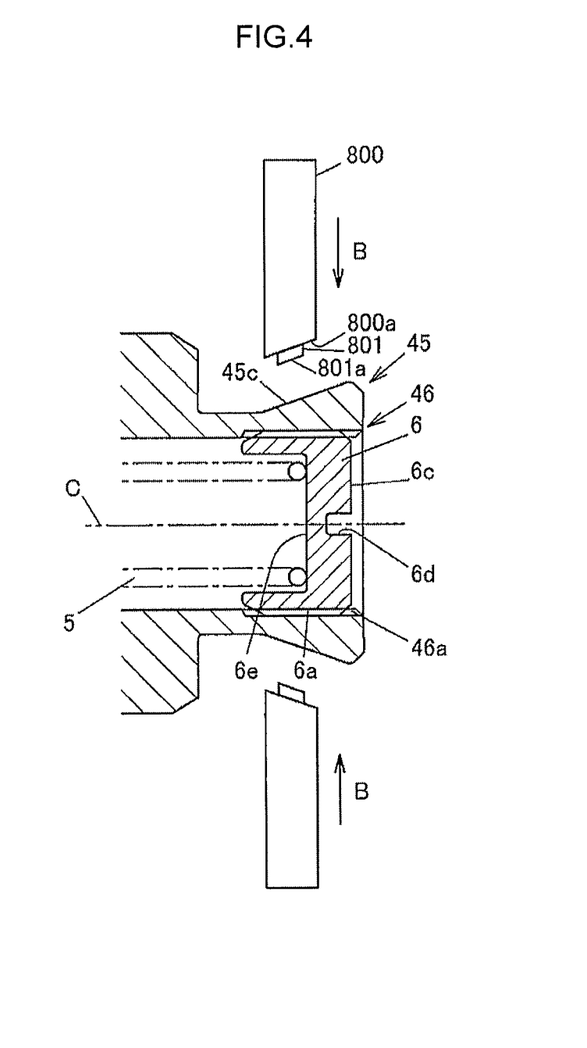
FIG. 4 is an illustration showing the fixing step in a solenoid valve according to a modification.

FIG. 4 is an illustration showing a swaging step according to the modification. A pressing portion 801 and a receiving surface 800a of a swaging tool 800 of the modification are different in shape from the pressing portion 80 and the receiving surface 8a of the swaging tool 8 of the present embodiment. The pressing direction of the swaging tool 800 for attaching the adjuster screw 6 in the modification is different from that of the swaging tool 8 for attaching the adjuster screw 6 in the present embodiment.

The pressing direction of the swaging tool 800 is a direction (direction shown by arrow B) parallel to a direction perpendicular to the central axis C. In the swaging tool 800, a pressing surface 801a of the pressing portion 801 and the receiving surface 800a are tilted to be substantially parallel to the outer peripheral surface 45c of the cylinder portion 45 of the sleeve 4. When the internally threaded portion 46 is swaged from its outer periphery with the swaging tool 800 having this configuration, the internally threaded portion 46 is subjected to a force having a component of the direction of a reaction force that is applied from the coil spring 5. Accordingly, the internal threads 46a can be plastically deformed to the opposite side from the coil spring 5 as in the case of the above embodiment. That is, functions and advantageous effects which are similar to those of the above embodiment can be obtained by the swaging tool 800 and the pressing direction (direction shown by arrow B) of the swaging tool 800 according to the modification.

Although the embodiment of the invention is described above, the invention is not limited to this and can be modified as appropriate without departing from the spirit and scope of the invention. For example, in the embodiment and the modification, the entire outer peripheral surface 45c of the cylinder portion 45 is tilted. However, only a part of the outer peripheral surface 45c of the cylinder portion 45 may be tilted. That is, the outer peripheral surface 45c other than the part to be swaged with the swaging tool 8 may not be tilted. At least one of the pressing surface 80a of the swaging tool 8 and the outer peripheral surface 45c of the cylinder portion 45 need only be a tilted surface. According to the embodiment and the modification, the solenoid valve 1 is configured so that the pressure of the hydraulic fluid that is output from the output port 42 decreases as the current of the electro-magnetic coil 20 is increased. However, the invention is not limited to this. Specifically, in the embodiment and the modification, the spool valve 3 is configured so that as the current to the electro-magnetic coil 20 is increased from the state where no current is applied thereto, the second land portion 32 and the third land portion 34 of the spool valve 3 are moved in the axial direction to reduce the flow rate of the hydraulic fluid flowing out from the supply port 41 to the output port 42. However, the second land portion 32 and the third land portion 34 of the spool valve 3 may be configured so as to increase the flow rate of the hydraulic fluid flowing out from the supply port 41 to the output port 42 when the current to the elector-magnetic coil 20 is increased.

What is claimed is:

1. A solenoid valve, comprising:
   a solenoid portion having a plunger that moves in an axial direction according to a current supplied to an electro-magnetic coil;
   a cylindrical sleeve placed coaxially with the plunger and having an outwardly protruding portion at its end located on an opposite side from the solenoid portion, the outwardly protruding portion having:
   a threaded inner peripheral surface, and
   an outer peripheral surface having a frustoconical shape such that a distance from a central axis of the sleeve to the outer peripheral surface of the outwardly protruding portion increases toward an opening in the sleeve located on the opposite side from the solenoid portion;
   a spool valve that is accommodated in a valve hole formed in the sleeve and that slides on an inner surface of the sleeve according to the axial movement of the plunger;
   an elastic member that biases the spool valve toward the solenoid portion; and
   an adjusting screw that is positioned to interpose the elastic member between the adjusting screw and the spool valve, and that is screwed in the threaded inner peripheral surface of the outwardly protruding portion so that its axial position is adjusted;
   wherein a part of the threaded inner peripheral surface of the outwardly protruding portion and a part of the outer peripheral surface of the outwardly protruding portion are plastically deformed to an opposite side from the elastic member such that rotation of the adjusting screw relative to the sleeve is restricted.

2. A manufacturing method of a solenoid valve,
   the solenoid valve including:
   a solenoid portion having a plunger that moves in an axial direction according to a current supplied to an electro-magnetic coil,
   a cylindrical sleeve placed coaxially with the plunger and having an internally threaded portion formed on an inner peripheral surface of its end located on an opposite side from the solenoid portion,
   a spool valve that is accommodated in a valve hole formed in the sleeve and that slides on an inner surface of the sleeve according to the axial movement of the plunger,
   an elastic member that biases the spool valve toward the solenoid portion, and
   an adjusting screw that is positioned to interpose the elastic member between the adjusting screw and the spool valve, and that is screwed in the internally threaded portion of the sleeve,
   wherein a biasing force of the elastic member which biases the spool valve is adjusted by the adjusting screw,
   the manufacturing method comprising:
   adjusting the biasing force of the elastic member by adjusting an axial position of the adjusting screw with respect to the sleeve by rotating the adjusting screw; and
   fixing the adjusting screw at a position adjusted by the adjusting step by pressing a swaging tool against the sleeve to swage the sleeve from an outer periphery of the internally threaded portion;
   wherein
   the fixing step plastically deforms the internally threaded portion in the axial direction to an opposite side from the elastic member by the swaging, and
   in the fixing step, a pressing surface of the swaging tool when approaching the outer periphery of the internally threaded portion is parallel to the outer periphery of the internally threaded portion, and the swaging tool is pressed against a tilted surface of the sleeve that is tilted so that a distance from a central axis of the valve hole to the tilted surface increases toward an opening end of the valve hole which is located on the internally threaded portion side of the sleeve.

3. The manufacturing method according to claim 2, wherein
   in the adjusting step, there is a gap in the axial direction between external threads of the adjusting screw and internal threads of the internally threaded portion, and
   in the fixing step, the internally threaded portion is deformed such that the internal threads of the internally threaded portion move to reduce the gap in the axial direction.

4. A manufacturing method of a solenoid valve,
   the solenoid valve including:
   a solenoid portion having a plunger that moves in an axial direction according to a current supplied to an electro-magnetic coil,
   a cylindrical sleeve placed coaxially with the plunger and having an internally threaded portion formed on an inner peripheral surface of its end located on an opposite side from the solenoid portion,
   a spool valve that is accommodated in a valve hole formed in the sleeve and that slides on an inner surface of the sleeve according to the axial movement of the plunger,
   an elastic member that biases the spool valve toward the solenoid portion, and
   an adjusting screw that is positioned to interpose the elastic member between the adjusting screw and the spool valve, and that is screwed in the internally threaded portion of the sleeve,
   wherein a biasing force of the elastic member which biases the spool valve is adjusted by the adjusting screw, the manufacturing method comprising:
- adjusting the biasing force of the elastic member by adjusting an axial position of the adjusting screw with respect to the sleeve by rotating the adjusting screw; and
- fixing the adjusting screw at a position adjusted by the adjusting step by pressing a swaging tool against the sleeve to swage the sleeve from an outer periphery of the internally threaded portion;

wherein
- the fixing step plastically deforms the internally threaded portion in the axial direction to an opposite side from the elastic member by the swaging, and
- in the fixing step, a pressing surface of the swaging tool when approaching the outer periphery of the internally threaded portion is parallel to the outer periphery of the internally threaded portion, and a pressing direction of the swaging tool has a component of a direction of a reaction force that is applied from the elastic member to the adjusting screw.

5. The manufacturing method according to claim 4, wherein
- in the fixing step, the swaging tool is pressed against a tilted surface of the sleeve that is tilted so that a distance from a central axis of the valve hole to the tilted surface increases toward an opening end of the valve hole which is located on the internally threaded portion side of the sleeve.

* * * * *